United States Patent
Stevens et al.

(10) Patent No.: US 9,574,018 B2
(45) Date of Patent: *Feb. 21, 2017

(54) METHOD FOR PRODUCING POLYETHYLENE

(75) Inventors: Peter Stevens, Mortsel (BE); Franky Fant, Wetteren (BE); Daan Dewachter, Mechelen (BE); Alain Brusselle, Wilrijk (BE)

(73) Assignee: TOTAL RESEARCH & TECHNOLOGY FELUY, Feluy (BE)

( * ) Notice: Subject to any disclaimer, the term of this patent is extended or adjusted under 35 U.S.C. 154(b) by 219 days.

This patent is subject to a terminal disclaimer.

(21) Appl. No.: 13/812,796

(22) PCT Filed: Jul. 29, 2011

(86) PCT No.: PCT/EP2011/063151
§ 371 (c)(1),
(2), (4) Date: Jan. 28, 2013

(87) PCT Pub. No.: WO2012/013807
PCT Pub. Date: Feb. 2, 2012

(65) Prior Publication Data
US 2013/0131288 A1    May 23, 2013

(30) Foreign Application Priority Data
Jul. 30, 2010  (EP) .................................. 10171360

(51) Int. Cl.
| | | |
|---|---|---|
| C08F 2/00 | (2006.01) |
| C08F 4/06 | (2006.01) |
| C08F 4/72 | (2006.01) |
| C08F 110/02 | (2006.01) |
| C08G 85/00 | (2006.01) |
| C08F 2/01 | (2006.01) |
| B01J 8/22 | (2006.01) |
| B01J 19/18 | (2006.01) |
| C08F 210/16 | (2006.01) |

(52) U.S. Cl.
CPC .................. *C08F 2/01* (2013.01); *B01J 8/226* (2013.01); *B01J 19/1837* (2013.01); *C08F 210/16* (2013.01); *B01J 2219/00006* (2013.01); *C08F 2410/03* (2013.01)

(58) Field of Classification Search
CPC ................. C08F 2/00; C08F 4/06; C08F 4/72; C08F 110/02; C08G 85/00
USPC ........................................... 526/352, 64, 113
See application file for complete search history.

(56) References Cited

U.S. PATENT DOCUMENTS

| | | | |
|---|---|---|---|
| 3,242,150 A * | 3/1966 | Scoggin | ........................ 526/64 |
| 3,794,627 A | 2/1974 | Giachetto | |
| 4,285,834 A * | 8/1981 | Lowery et al. | ............... 502/113 |

(Continued)

*Primary Examiner* — Alexa Neckel
*Assistant Examiner* — Elizabeth Eng
(74) *Attorney, Agent, or Firm* — Albert Shung

(57) ABSTRACT

The present invention relates to a method for consecutively producing at least two different polyethylene resins in one slurry loop reactor, comprising producing a first polyethylene resin in the presence of a Ziegler-Natta and/or a Chromium catalyst, and consecutively producing a second polyethylene resin in the presence of a metallocene catalyst, characterized in that the ratio of the melt flow index of the first produced polyethylene resin to the melt flow index of the second produced polyethylene resin is at least 0.3.

18 Claims, 5 Drawing Sheets

(56) References Cited

U.S. PATENT DOCUMENTS

| | | | |
|---|---|---|---|
| 5,442,019 A * | 8/1995 | Agapiou et al. | 526/82 |
| 6,284,849 B1 * | 9/2001 | Almquist | C08F 10/00 502/152 |
| 6,355,733 B1 * | 3/2002 | Williams | C08L 23/04 525/191 |
| 6,730,751 B2 * | 5/2004 | Shamshoum et al. | 526/113 |
| 6,864,207 B2 | 3/2005 | Knoeppel | |
| 6,930,071 B2 | 8/2005 | Knoeppel | |
| 2004/0249083 A1 * | 12/2004 | Maziers | 525/240 |
| 2008/0262171 A1 * | 10/2008 | Lee et al. | 526/64 |

* cited by examiner

METHOD FOR PRODUCING POLYETHYLENE

CROSS-REFERENCE TO RELATED APPLICATIONS

This application claims the benefit of PCT/EP2011/063151, filed Jul. 29, 2011, which claims priority from EP 10171360.0, filed Jul. 30, 2010.

TECHNICAL FIELD OF THE INVENTION

The present invention relates to the field of producing polyethylene. In particular, the invention relates to a process for the sequential production of polyethylene in a slurry loop reactor. More in particular the invention relates to a process for the consecutive production of polyethylene having different properties in a slurry loop reactor.

BACKGROUND OF THE INVENTION

Polyolefins, such as polyethylene (PE), are synthesized by polymerizing olefin, such as ethylene ($CH_2$=$CH_2$), monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Olefin polymerizations are frequently carried out in a loop reactor using monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Loop reactors may be used for production of polyethylene with different characteristics. However, to avoid contamination of a subsequently produced polyethylene with a residue of a previously produced polyethylene, production equipment is cleaned or purged between production runs of different polymers. Cleaning minimizes the risk of contamination of the subsequently produced polyethylene product with the previously produced polyethylene product and aims to maintain the quality of the subsequently produced polyethylene batch, and/or prevent clogging of production equipment.

The purpose of the cleaning and purging operations is not only to avoid contamination of the produced products but also to optimize the conditioning of the polymer before production begins. As an example, purging of an extrusion apparatus is necessary to remove any material from previous runs adhering to the extrusion apparatus walls. If not removed, this material, subject to the heat of the extrusion process, degrades over time and can contaminate fresh polymer passing through the extrusion apparatus. This is in particular further true when the extrusion apparatus is used to consecutively extrude polymer products that have been prepared in the presence of different and incompatible polymerization catalysts.

A cleaning operation entails the participation of numerous operators. This work is not only very demanding in terms of labour, but also results in a significant down time of the reactor while cleaning operations are performed as cleaning procedures include extensive flushing of the reactor pipes, extensive physical effort with brushes, detergent and water, or even entirely reactor dismantling. Therefore, cleaning operations not only are time-consuming, but also are cost-ineffective.

In view of the above, there is a need in the art for an improved process for the consecutive production of different polyethylene products. In particular there is a need to streamline the transition of the production of one polyethylene product into a subsequent polyethylene product and to provide a production process which is less time consuming and generally more cost-effective.

SUMMARY OF THE INVENTION

One or more of the above problems of the prior art may be overcome with the present invention. The inventors have surprisingly found that by selecting consecutive polyethylene products to be produced, each with a certain melt flow index, no or minimal cleaning or purging of the polyethylene production line (comprising the ethylene polymerization reactor as well as the downstream components such as dryers, extruders, mixers or storage silos, including connecting conduits or transportation means) is needed.

In particular, the inventors have unexpectedly found that different polyethylene products of which the melt flow index ratio between the first and the second polyethylene product is at least 0.3 can be consecutively produced and processed in the same ethylene polymerization and processing line without having to clean or purge the components involved therein. As such, according to the invention, an important improvement in respect of time- and cost-effectiveness of the polyethylene production process is realized. Less or no cleaning leads to a faster processing time higher throughput and hence a higher production capacity. Accordingly, in a first aspect the present invention concerns a method for consecutively producing at least two different polyethylene resin in one slurry loop reactor, comprising the steps of producing a first polyethylene resin in the presence of a Ziegler-Natta and/or a Chromium catalyst, and consecutively producing a second polyethylene resin in the presence of a metallocene catalyst, characterized in that the ratio of the melt flow index of the first produced polyethylene resin to the melt flow index of the second produced polyethylene resin is at least 0.3.

Surprisingly, the present inventors have found a way to improve the transition from one polymer grade to another polymer grade. The present invention therefore also relates to a method of transition between polyethylene resins of different grades comprising the steps of producing in a loop reactor a first polyethylene resin in the presence of a Ziegler-Natta and/or a Chromium catalyst, and consecutively producing in the same loop reactor a second polyethylene resin in the presence of a metallocene catalyst, characterized in that the ratio of the melt flow index (MI) of the first produced polyethylene resin to the melt flow index of the second produced polyethylene resin is at least 0.3. Preferably, said production is performed continuously.

The present invention is particularly useful for reducing the amount of off-specifications polyethylene.

The present inventors have found that according to the invention, less cleaning of the reactor and downstream equipment is required. This results in less down-time of the reactor and hence increases productivity and leads to an overall improved cost-effectiveness. Moreover, the invention may lead to less or no intermediate waste during the consecutive production of polyethylene resins. In addition, the invention leads to more optimal production results, lower downstream contamination and smaller, or even no, off-specification batches between different production runs. As a result of a reduced change-over time between consecutively produced polyethylenes, the required quality is more quickly obtained.

Without wishing to be bound by any theory, the inventors believe that polyethylene might deposit around bends and curves during production runs. If not removed, these deposits may ultimately block the equipment. The present inventors have found that, by carefully selecting the order of polyethylene production under guidance of the Melt Index ratio as defined in the present invention, polymer deposits will be subsequently removed, possibly by properly mixing in with later produced polyethylene, avoiding equipment cleaning, limiting waste generation, reducing equipment down-time, yet creating optimal product characteristics. In addition, instead of using different reactors for production of different polymers, the present invention allows for use of only one reactor.

Mixing or blending of polyethylenes with a narrow molecular weight distribution in general tends to be more troublesome than mixing polyethylenes with a broad molecular weight distribution. Hence, contamination of one polyethylene with a narrow molecular weight distribution with another polyethylene with a narrow molecular weight distribution may be more prone to quality loss of the final product. In an embodiment, the present invention therefore in particular solves these problems associated with the consecutive production of polyethylene with a narrow molecular weight distribution.

In a further embodiment, the invention relates to a method or use as described herein, wherein said consecutively produced polyethylene resins have a monomodal molecular weight distribution.

In a further embodiment, the invention relates to a method or use as described herein, wherein at least two of said different polyethylenes have a different molecular weight distribution.

In this way, polyethylene production need not be halted or interrupted for cleaning purposes after the production of a polyethylene with a low melt flow index. By selecting a subsequent polyethylene of which the melt flow index ratio with the previously produced polyethylene is at least 0.3 allows for gradually increasing the melt flow index between each consecutively produced polyethylene, allowing the use of polymers with a higher MI subsequently to polymers with a lower MI while avoiding equipment cleaning.

DETAILED DESCRIPTION OF THE INVENTION

Figure 1:
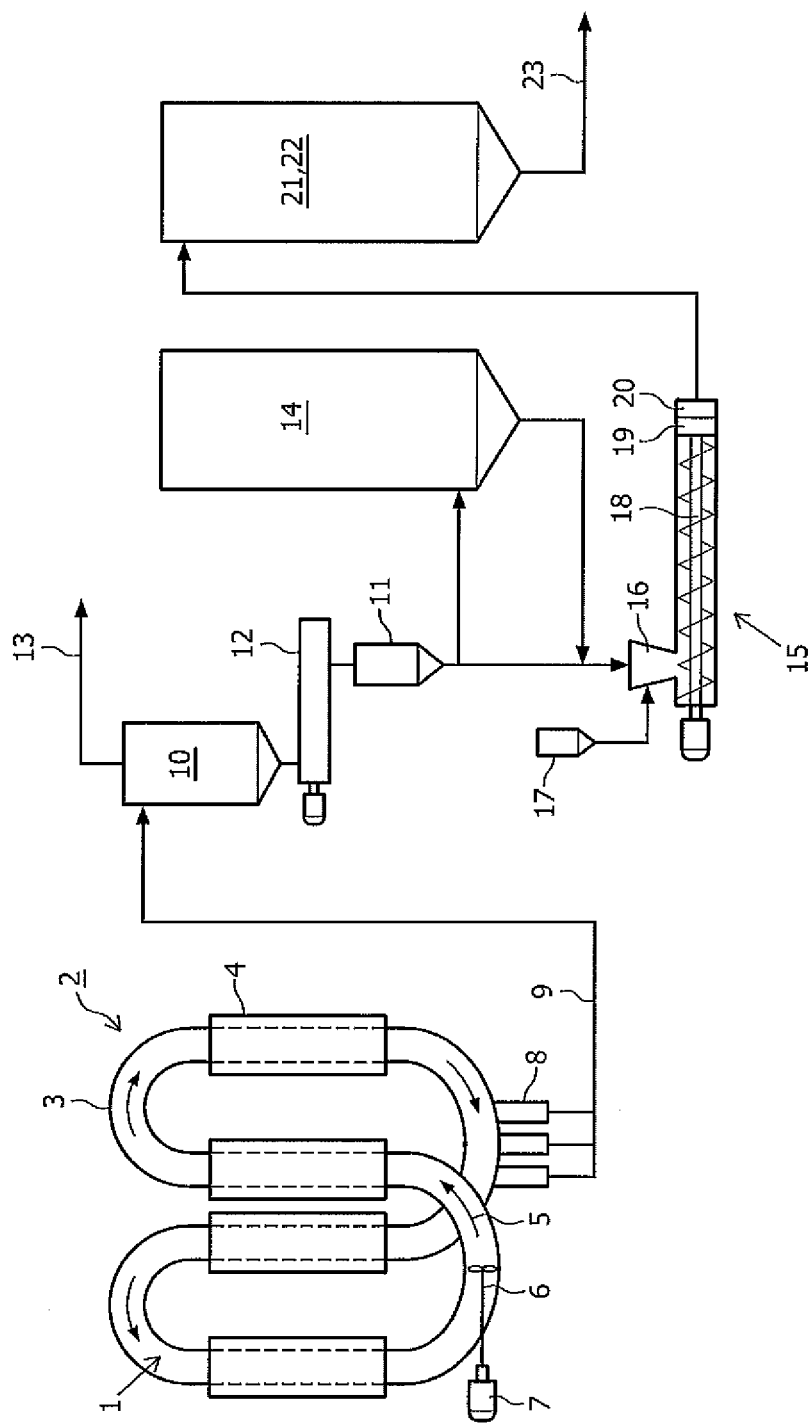
FIG. 1 schematically represents a polyethylene production line according to an embodiment of the invention.

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a method for consecutively producing at least two different polyethylene resins in one slurry loop reactor, comprising the steps of producing a first polyethylene resin in the presence of a Ziegler-Natta and/or a Chromium catalyst, and consecutively producing a second polyethylene resin in the presence of a metallocene catalyst, characterized in that the ratio of the melt flow index of the first produced polyethylene resin to the melt flow index of the second produced polyethylene resin is at least 0.3. Preferably said production of the two different polyethylene resins is continuous. Preferably, the first polyethylene resin is produced in the presence of a Ziegler-Natta catalyst.

In an embodiment, the invention relates to a method for the sequential production of at least two different polyethylene resins in one slurry loop reactor, comprising the steps of: (a) producing a first polyethylene resin in said loop reactor; (b) discharging said first polyethylene resin from said reactor; (c) producing a second polyethylene resin in said loop reactor; characterized in that the ratio between the melt flow index of said first polyethylene resin ($MI_f$) and the melt flow index of said second polyethylene resin ($MI_s$) is at least 0.3.

In particular the present invention relates to a method for consecutively producing at least two different polyethylene resin in one slurry loop reactor, comprising the steps of: (a) producing a first polyethylene resin in said loop reactor in the presence of a Ziegler-Natta and/or a Chromium catalyst, (b) discharging said first polyethylene resin from said reactor; (c) consecutively producing a second polyethylene resin in said loop reactor in the presence of a metallocene catalyst, characterized in that the ratio of the melt flow index of the first produced polyethylene resin to the melt flow index of the second produced polyethylene resin is at least 0.3.

The present invention therefore provides an improved process for regulating the transition of one polyethylene grade to another polyethylene grade through an ethylene production line comprising an ethylene polymerization reactor. The invention therefore also provides a method of transition between polyethylene resins comprising the steps of (a) producing a first polyethylene resin in said loop reactor in the presence of a Ziegler-Natta and/or a Chromium catalyst, (b) discharging said first polyethylene resin from said reactor; (c) consecutively producing a second polyethylene resin in said loop reactor in the presence of a metallocene catalyst, characterized in that the ratio of the melt flow index of the first produced polyethylene resin to the melt flow index of the second produced polyethylene resin is at least 0.3.

The inventors have surprisingly found that by selecting consecutive polyethylene to be produced, each with a certain melt flow index, less cleaning of the polyethylene production line, in particular the reactor, extruder and conduits, is needed.

A "polyethylene grade" as used herein is a polyethylene that falls within a given set of specifications, which define specific properties that the polyethylene must have, for example a melt flow index and a density falling within given ranges. As used herein, the term "different polyethylene" refers to polyethylenes which have at least one different (i.e. non-identical) physicochemical, mechanical, optical, or otherwise characteristic property. Different polyethylenes can be produced under different reactor conditions. Non-limiting examples of such properties include density, molecular weight, molecular weight distribution, melt flow index, melting point, strength, elongation, modulus, toughness, flexibility, heat resistance, haze, gloss, transparency, clarity, transmittance, etc. Each of these properties or parameters can be routinely determined or measured with techniques known in the art. In an embodiment of the invention, two different polyethylene resins refers to polyethylene resins wherein the ratio of the melt flow index (MI) of a first polyethylene ($MI_f$) to the MI of a later processed polyethylene ($MI_l$) is at least 0.3.

In particular, the inventors have unexpectedly found that different polyethylene resins of which the melt flow index ratio between consecutively produced polyethylene resins is at least 0.3 can be consecutively produced and processed in the same ethylene polymerization and processing line without having to clean the components involved therein. As such, according to the invention, an important improvement in respect of time- and cost-effectiveness of the polyethylene production process is realized. Less or no cleaning leads to a faster processing time higher throughput and hence a higher production capacity. The method of the invention leads to more optimal production results, lower downstream contamination and smaller, or even no, off-spec batches between different production runs.

For the purpose of this invention, "resin" is defined as the polymer material that is produced in the loop reactor with the hard catalyst particle at the core of each grain of the powder and which is also sometimes referred to as "fluff".

Accordingly, the invention is directed at optimizing production run scheduling of large production batches to avoid down-time and cleaning efforts.

In an embodiment, the invention relates to a method or use as described herein, wherein the ratio between the melt flow indexes of at least two consecutively produced polyethylene resins is at least 1, preferably at least 2, preferably at least 3.

In an embodiment, the invention relates to a method or use as described herein, wherein the ratio between the melt flow index of at least two consecutively produced polyethylene resins is between 0.3 and 15, for example between 1 and 15, for example between 2 and 15, for example between 3 and 15, for example between 3 and 10.

The invention is characterized in that between discharging the first polyethylene from the reactor and the production of the next polyethylene, no or less cleaning operations are performed, provided that the ratio between the melt flow index of a first polyethylene resin and the consecutively produced polyethylene resin is at least 0.3. In an embodiment, the ratio between the melt flow indexes of at least two consecutively produced polyethylene resins is between 0.3 and 15.

As used herein "cleaning" refers to cleaning of a polymerization reactor and/or downstream polyethylene transportation, and/or treatment equipment such as conduits, flash tanks, dryers and extruders. Cleaning of the loop reactor can be performed by any means known in the art, such as without limitation chemical cleaning or mechanical cleaning. Cleaning may involve flushing or rinsing all units in the polyethylene production line with cleaning agents (among which detergents), such as, without limitation high pressure water cleaning.

In an embodiment, the polyethylene resins may be produced in a single loop reactor or in a double loop reactor. In a preferred embodiment, the polyethylene resins are produced in the same single loop reactor. As used herein, the term "loop reactor" or "slurry loop reactor" refers to a closed circuit tubular polymerization reactor for the production of polyethylenes. Essentially, these reactors consist of a long pipe or tube, arranged in loops. Loop reactors are known in the art and will not be detailed further. The loop reactors as described herein are liquid full reactors, meaning that they are free or essentially free of a gaseous phase while in operation. As used herein, "double loop reactor" means two single loop reactors which are coupled in series, wherein the content of a first single loop reactor after completion of the polymerization reaction is fed to a second single loop reactor.

The invention relates to the sequential production of different polyethylene resins. It is to be understood that sequential production is used synonymously with consecutive production. According to the invention, the melt flow indexes of the sequentially produced polyethylene resins are compared. In this context, reference is made to a "first" polyethylene and a "later" or "second" polyethylene. The "first" polyethylene is the one which is produced in time prior to the "later" polyethylene. The "first" polymer corresponds to the former or prior polymer, whereas the "later" polymer corresponds to the latter or subsequent polymer. According to the invention, melt flow indexes are compared between immediately consecutive polyethylene resins. For example the melt flow index of a first polymer is compared with the melt flow index of a second polymer; the melt flow index of a second polymer is compared with the melt flow index of a third polymer; the melt flow index of a third polymer is compared with the melt flow index of a fourth polymer; and so on.

According to the invention, the ratio between the melt flow index of a first (i.e. former or prior) polyethylene and the melt flow index of a later (i.e. latter or subsequent) polyethylene is determined. As used herein, the ratio is defined as the arithmetic division or the quotient of the melt flow index of the first polyethylene ($MI_f$) by the melt flow index of the later polyethylene ($MI_l$) according to the following formula (I):

$$\text{Ratio} = \frac{MI_f}{MI_l} \quad (1)$$

The melt flow index is a measure of the ease of flow of the melt of a thermoplastic polymer. The melt flow index is an indirect measure of molecular weight, high melt flow index corresponding to low molecular weight. It is defined as the mass of polymer in grams flowing in 10 minutes through a capillary of specific diameter and length by a pressure applied via prescribed alternative gravimetric weights for alternative prescribed temperatures. The method is given in ASTM D1238. Synonyms of melt flow index (MFI) are melt flow rate (MFR) and melt index (MI). According to the invention, the melt flow index for polyethylene as used herein is determined according to ASTM D1238, condition E, at a temperature of 190° C. and a load of 2.16 kg.

It is to be understood that the present invention relates to the consecutive production of different polyethylene. As used herein, the term "different polyethylene" refers to polyethylene resins which have at least one different (i.e. non-identical) physicochemical, mechanical, optical, or otherwise characteristic property. Different polyethylenes are produced under different reactor conditions. Non-limiting examples of such properties include density, molecular weight, molecular weight distribution, melt flow index, melting point, strength, elongation, modulus, toughness, flexibility, heat resistance, haze, gloss, transparency, clarity, transmittance, etc. Each of these properties or parameters can be routinely determined or measured with techniques known in the art. In a preferred embodiment, at least two of said different polyethylenes have a different molecular weight distribution.

In an embodiment, said consecutively produced polyethylene resins have a monomodal molecular weight distribution. In another embodiment, at least one polyethylene has a monomodal molecular weight distribution. In a further embodiment, at least two consecutively produced polyethylene resins have a monomodal molecular weight distribution.

By the term "monomodal polyethylene" it is meant, polymers having one maxima in their molecular weight distribution curve. By the term "polymers with a bimodal molecular weight distribution" or "bimodal polymers" it is meant, polymers having two maxima in their molecular weight distribution curves. By the term "polymers with a multimodal molecular weight distribution" or "multimodal" polymers it is meant polymers with at least two, preferably above two maxima in their molecular weight distribution curves.

In an embodiment, the consecutively produced polyethylene resins are produced in the presence of a catalyst which yields polyethylene resins that have a narrow molecular weight distribution, in particular metallocene catalysts.

Polyethylene polymerizations are frequently carried out using monomer, diluent and catalyst and optionally co-monomers and hydrogen in a loop reactor. The polymerization is usually performed under slurry conditions, wherein the product usually consists of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. The polymer particles are dried, additives can be added and finally the polymer is extruded and pelletized. "Polyethylene pellet" as used herein is defined as ethylene polymer material that is produced through compounding and homogenizing of the resin, for instance with mixing and/or extruding equipment.

In an embodiment, the polyethylene resins are produced in a slurry loop reactor, comprising the steps of
feeding ethylene monomer, a liquid hydrocarbon diluent, at least one ethylene polymerization catalyst, optionally hydrogen, and optionally one or more olefin co-monomers to said loop reactor, thereby obtaining an ethylene polymerization catalyst slurry;
polymerizing said ethylene and said optionally one or more olefin co-monomers in said loop reactor to produce said polyethylene resin.

As used herein, the term "ethylene polymerization catalyst slurry" refers to solid particles of ethylene polymerization catalyst comprised in a liquid diluent suitable for the polymerization of ethylene.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts or polymerization catalysts or catalysts. In the present invention it is especially applicable to ethylene polymerization catalysts such as metallocene catalysts, chromium catalysts and/or Ziegler-Natta catalysts.

In an embodiment of the invention the subsequently (second) polyethylene resin is produced in the presence of a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR^2_3$ group wherein $R^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;
wherein M is a transition metal M selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogen, a hydrosilyl, a $SiR^2_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts are preferably provided on a solid support. The support is preferably an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In an embodiment, the catalyst for use in the present process is a supported metallocene-alumoxane catalyst consisting of a metallocene and an alumoxane which are bound on a porous silica support.

In a preferred embodiment, a polymerization catalyst applied in the present polymerization process is a supported metallocene-alumoxane catalyst consisting of a metallocene and an alumoxane which are bound on a porous silica support.

In an embodiment of the present invention, said first polyethylene resin is produced in the presence of a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

In another embodiment of the present invention, said first polyethylene resin is produced in the presence of a Ziegler-Natta catalyst. The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Preferred ZN catalysts according to the invention are described in U.S. Pat. Nos. 6,930,071 and 6,864,207, which are incorporated herein by reference.

As used herein, the term "liquid diluent" refers to diluents, preferably in liquid form that is in a liquid state. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

By the term "polymerization" it is meant feeding to a reactor reactants including monomer (ethylene), a diluent, a catalyst and optionally a co-monomer, an activating agent and a terminating agent such as hydrogen. A homo-polymer or co-polymer results.

The term "co-polymer" refers to a polymer that is made by linking two different types of in the same polymer chain. The term "homo-polymer" refers to a polymer which is made by linking ethylene monomers, in the absence of co-monomers.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. Nos. 6,930,071 and 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

FIG. 1 schematically represents an ethylene polymerization and processing line wherein the present method according to an embodiment of the invention can advantageously be performed. The line comprises a loop reactor 2. The reactor 2 comprises a plurality of interconnected pipes 3. The vertical sections of the pipe 3 segments are preferably provided with heat jackets 4. Ethylene monomer, diluent, polymerization catalyst and optionally hydrogen and olefin co-monomers 1 are fed to a loop reactor 2 and form polymerization slurry. The polymerization slurry is circulated as illustrated by arrows 5 continuously with a pump 6, which is driven by an external motor 7. When polymerizing ethylene, in the presence of a suspension of catalyst in diluent, said diluent having low solubility for the polymer, the polymer is produced in the form of solid particles, insoluble in the diluent. In an embodiment, the method for consecutively producing at least two different polyethylene resins according to the invention is performed in said reactor 2. In particular a first polyethylene with a melt flow index ($MI_f$) is produced in reactor 2, in the presence of a Ziegler-Natta and/or a Chromium catalyst. Subsequently, an intermediate polyethylene having a melt flow index ($MI_i$) is produced in the presence of a metallocene catalyst. According to the invention, the ratio of the MI of the first polyethylene ($MI_f$) to the MI of the later produced polyethylene ($MI_l$) is at least 0.3, for example at least 0.5, for example at least 1, for example at least 2, for example at least 3 Polyethylene slurry, consisting of the reactants and polyethylene powder, is collected in one or more settlings legs 8 connected to the pipes 3 of the reactor 2. Polymer slurry settled in the settling legs 8 of reactor can be periodically discharged by means of one or more product recovery lines 9 to a flash tank 10, through flash lines. While being depressurized, the slurry is degassed, for example during transfer through heated flash lines 9 to a flash tank 10. In the flash tank 10, to increase the solid content, most of the light hydrocarbon diluent and unreacted ethylene evaporates and the product and diluent are separated, yielding a dry bed of polyethylene in powder form (often referred to as "fluff"). The powder is discharged to a purge column 11 in which the remaining light hydrocarbon and co-monomer are removed. A conveyor drying unit 12 may be employed before the purge column 11 in some instances. The gas coming out from the flash tank 10 and from the purge column 11 is treated in a distillation section 13. This allows the separate recovery of diluent, monomer and comonomer. Then the powder of polyethylene is transported to a finishing area where various stabilizers and additives are incorporated. The powder product is transported under nitrogen to fluff silos 14 and extruded into pellets. Alternatively, the powder may be directly fed to an extruder 15. Typically, an extruder 15 works by melting and homogenizing the powder and then forcing it through holes before cutting to form pellets. Powder is fed to the extruder 15 via a feed hopper 16. During the extrusion process ingredients including polymer product, optional additives 17, etc, are mixed intimately in order to obtain a compound as homogeneous as possible. An extrusion apparatus 15 generally has one or more rotating screws 18 wherein the polymer is mixed and melted, an extrusion die 19 and means for cutting 20 the extruded filaments into pellets. A molten state polymer is pumped under pressure, through a die 19, producing a continuous cross-section or profile. The pumping action is typically performed by a screw 18 inside an extrusion apparatus 15 or a combination of screws 18 or with a gear pump. Surprisingly, by applying the present method, the present inventors have found less cleaning of the reactor and downstream equipment is required. The melt is then cooled and granulated, e.g. to form pellets. In this form the resulting compound can then be used for the manufacturing of different objects. The pellets are transported to a pellet treatment unit 21 comprising silos and hot and cool air flow allows the removal of residual components from the pellets. The pellets then are directed to homogenization silos 22 before final storage 23.

The present invention allows to have less or no intermediate waste during the consecutive production of polyethylene resins of different grades. Consecutively producing polyethylene according to the present method permit lower downstream contamination and smaller, or even no, off-spec batches between different production runs.

The inventors have surprisingly found that the quality of a produced polyethylene product, in particular the physicochemical characteristics (such as density, molecular weight, molecular weight distribution, melt flow index, melting point, etc.), mechanical characteristics (such as, strength, elongation, modulus, toughness, flexibility, heat resistance, etc.), and optical characteristics (such as haze, gloss, transparency, clarity, transmittance, etc.) meets at least the same high standards when such product is produced subsequently to a prior produced different polyethylene resins with or without intermittent cleaning and/or purging of the production unit if the melt flow index ratio between the first and the second polyethylene product is at least 0.3.

The invention will be more readily understood by reference to the following examples, which are included merely for purpose of illustration of certain aspects and embodiments of the present invention and are not intended to limit the invention.

EXAMPLES

The following test methods were used to evaluate resins prepared.

$MI_2$ were measured at 190° C. under a 2.16 kg load according ASTM D-1238.

Gels level was measured in the extruded pellets as ppm as a function of time. Acceptable commercial specification (Comm spec) for gels in metallocene produced resin was maximum 40 ppm. Gels are measured on cast film lab extruder using optical camera (OCS system): defaults on the film are expressed under part per million of total film surface.

Example 1

Two different polyethylene resins were consecutively produced in the same slurry loop reactor: the first polyethylene resin was produced in the presence of a Ziegler-Natta catalyst (ZN). The melt flow index $MI_2$ of the ZN produced polyethylene resin was 0.7 g/10 min. At the end of the ZN run and after catalyst shift procedure (consisting in killing, emptying and conditioning the reactor), a second polyethylene resin was consecutively produced in the same reactor in the presence of a metallocene catalyst. $MI_2$ of the metallocene produced resin was 8 g/10 min. The ratio of the $MI_2$ of the ZN produced resin to the $MI_2$ of the metallocene produced resin was 0.09.

The resins were consecutively extruded. The gel level was measured in the extruded pellets as ppm as a function of time.

Figure 2A:
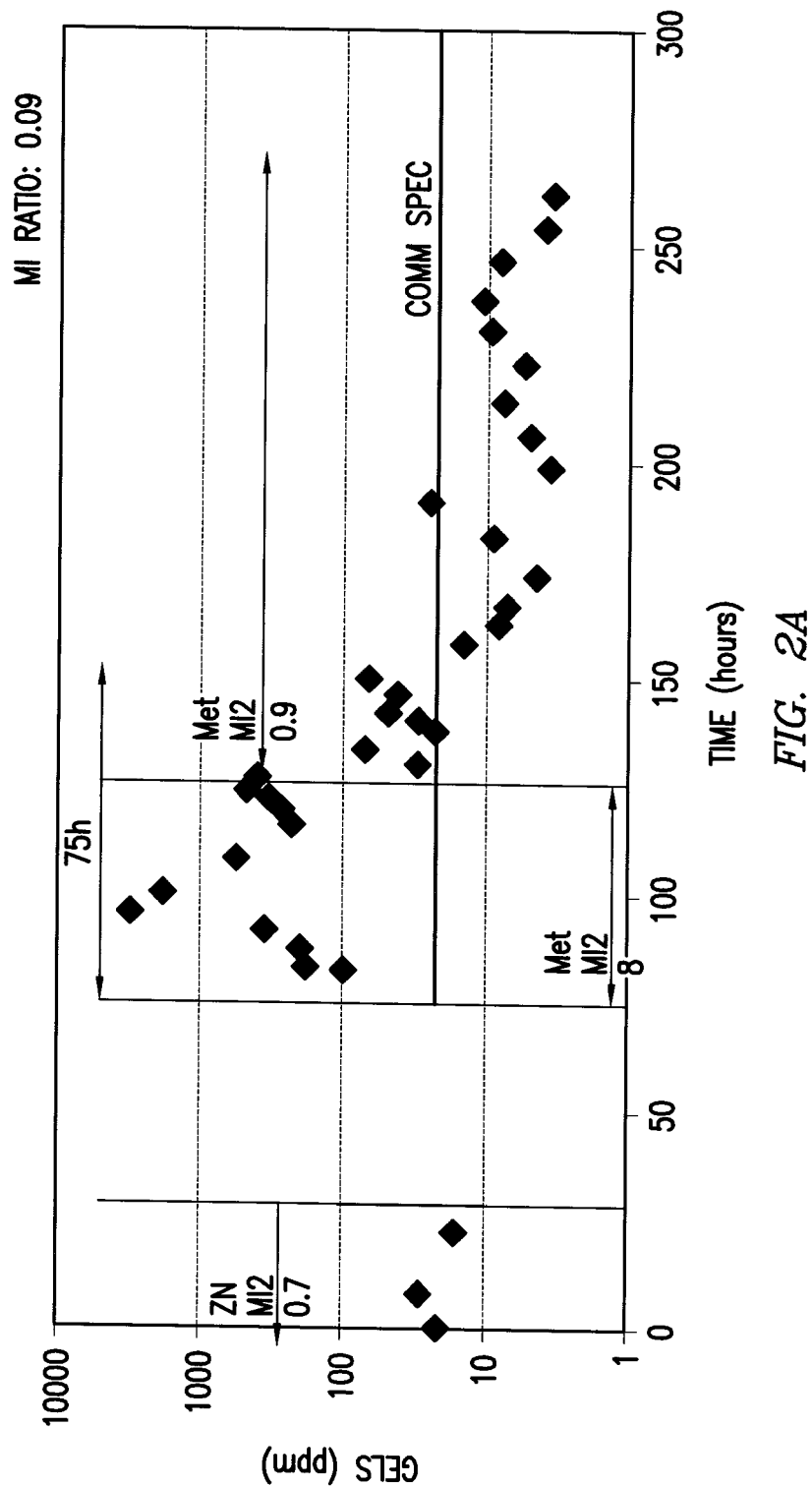
FIGS. 2A and 2B represent graphs measuring the amounts of gels (in ppm) as a function of time for two different polyethylene resins consecutively produced in the same slurry loop reactor, wherein the first polyethylene resin is produced in the presence of a Ziegler-Natta catalyst, and the second polyethylene resin is produced in the presence of a metallocene catalyst, and wherein the ratio of $MI_2$ of the first produced polyethylene resin to the $MI_2$ of the second produced polyethylene resin is below 0.3.

The gels level measured in the extruded resins are shown in FIG. 2A. High level of gels was observed during about 3 days. The specification of the resin was finally corrected thanks to contamination dilution with time and production of resins with an $MI_2$ of 0.9.

Example 2

Two different polyethylene resins were consecutively produced in one slurry loop reactor: a first polyethylene resin with a $MI_2$ of 0.9 g/10 min was produced in the presence of a Ziegler-Natta catalyst. At the end of the ZN run and after catalyst shift procedure (consisting in killing, emptying and conditioning the reactor), a second polyethylene resin with a $MI_2$ of 8 g/10 min was consecutively produced in the same reactor in the presence of a metallocene catalyst. The ratio of the $MI_2$ of the first produced polyethylene resin to the $MI_2$ of the second produced polyethylene resin was 0.11.

The resins were consecutively extruded. The gel level was measured in the extruded pellets as ppm as a function of time.

Figure 2B:
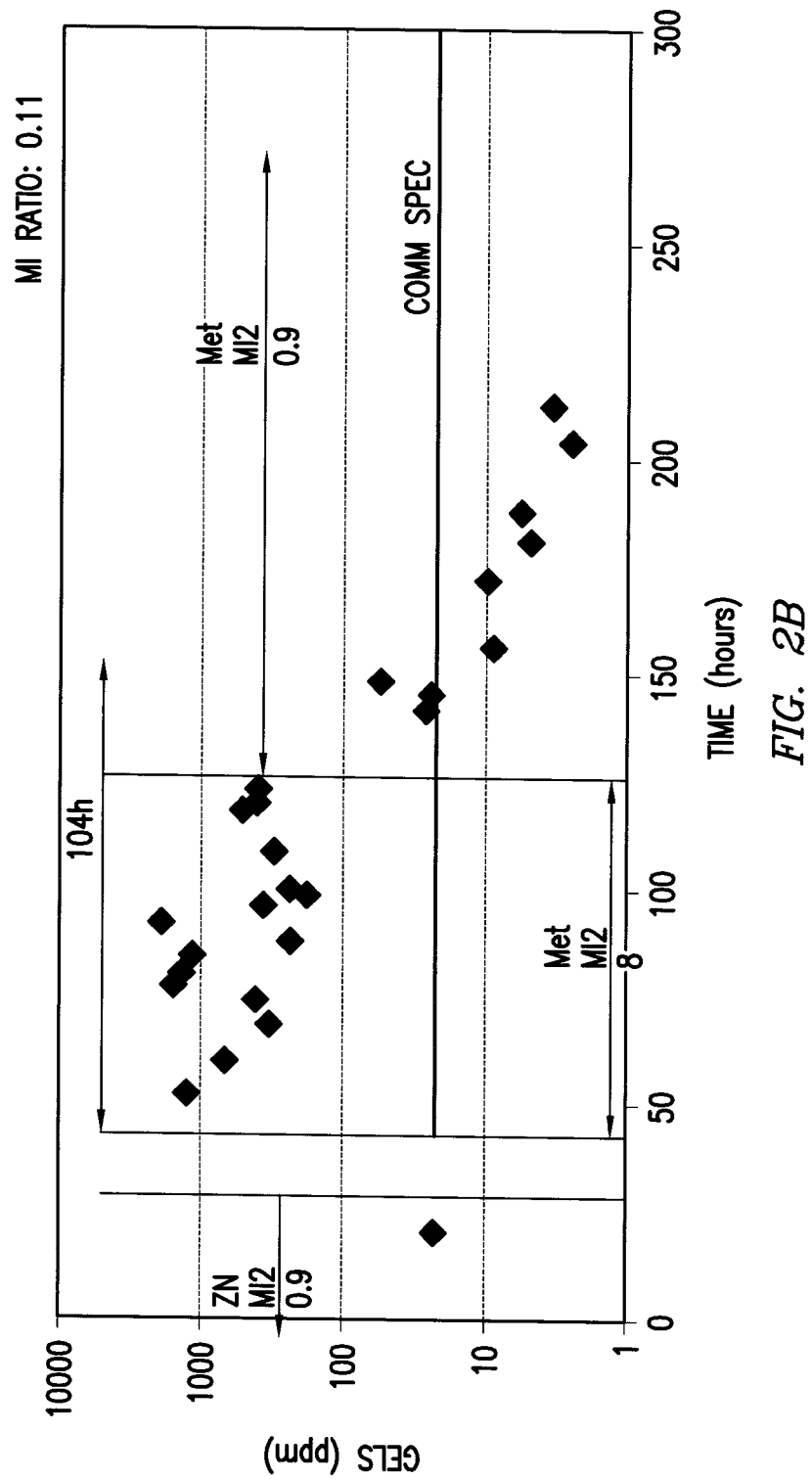

The gels level measured in the extruded resins are shown in FIG. 2B. High level of gels was observed during about 4 days. The specification of the resin was finally corrected thanks to contamination dilution with time and production of resins with an $MI_2$ of 0.9.

Example 3

Two different polyethylene resins were consecutively produced in one slurry loop reactor: A first polyethylene resin with a $MI_2$ of 7.5 g/10 min was produced in the presence of a Ziegler-Natta catalyst. At the end of the ZN run, and in the same reactor, a second polyethylene resin with a $MI_2$ of 0.9 g/10 min was consecutively produced in the presence of a metallocene catalyst. The ratio of the $MI_2$ of the first produced polyethylene resin to the $MI_2$ of the second produced polyethylene resin was 8.3.

Figure 3A:
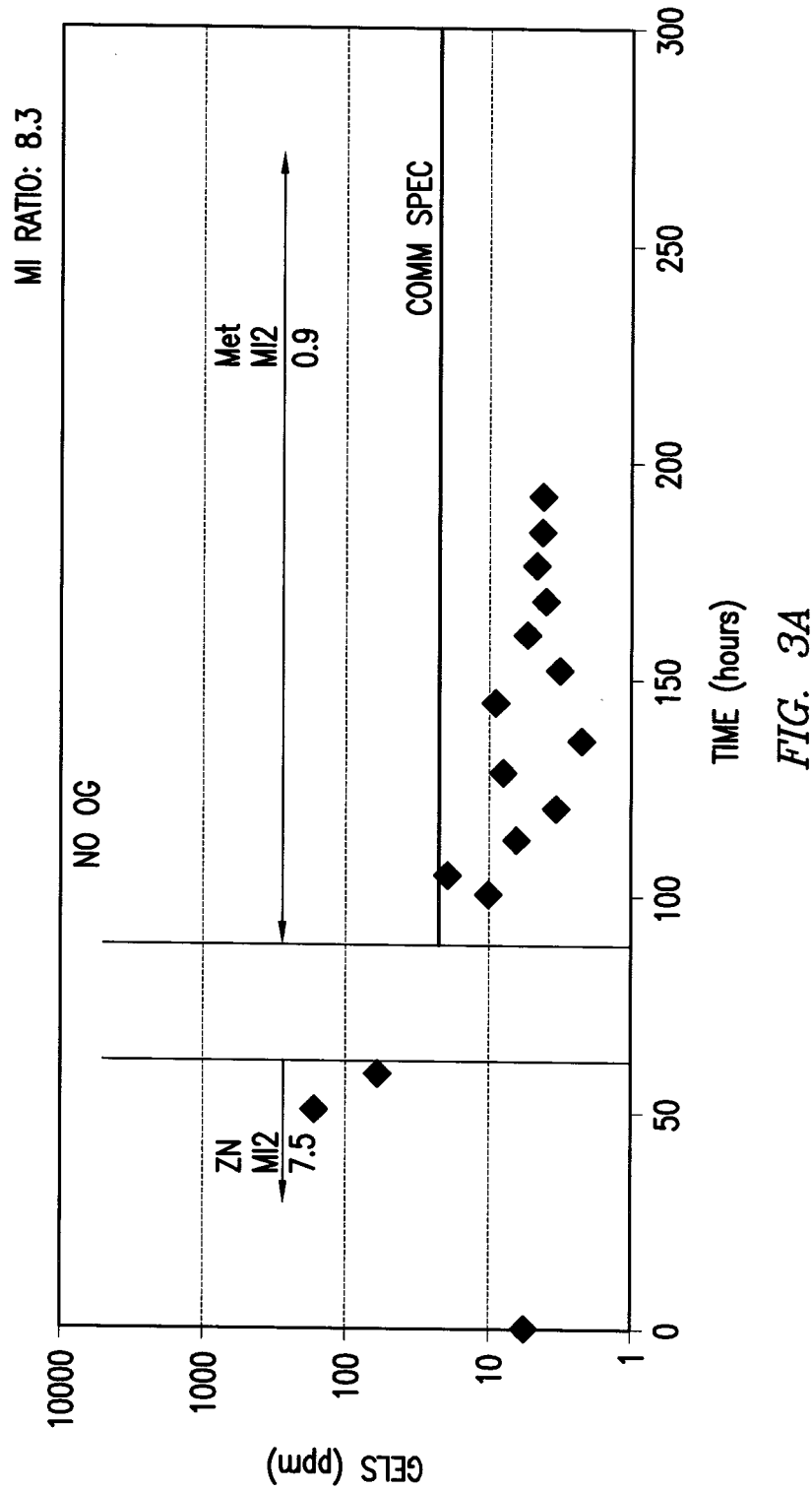
FIGS. 3A and 3B represent graphs measuring the amounts of gels (in ppm) as a function of time for two different polyethylene resins consecutively produced in the same slurry loop reactor, wherein the first polyethylene resin is produced in the presence of a Ziegler-Natta catalyst, and the second polyethylene resin is produced in the presence of a metallocene catalyst, and wherein the ratio of $MI_2$ of the first produced polyethylene resin to the $MI_2$ of the second produced polyethylene resin is above 0.3.

The resins were consecutively extruded. The gel level was measured in the extruded pellets as ppm as a function of time. The results are shown in FIG. 3A. As shown in the figures no off grades (OG) was observed. The present inventors have shown that gels problem could be controlled. This was achieved by making sure that the melt flow index ratio between the first and the second polyethylene product was at least 0.3.

Example 4

Two different polyethylene resins were consecutively produced in the same slurry loop reactor: A first polyethylene resin with a $MI_2$ of 0.9 g/10 min was produced in the presence of a Ziegler-Natta catalyst. At the end of the ZN run, a second polyethylene resin with a $MI_2$ of 0.9 g/10 min was consecutively produced in the presence of a metallocene catalyst in the same reactor. The ratio of the $MI_2$ of the first produced polyethylene resin to the $MI_2$ of the second produced polyethylene resin was 1.0.

Figure 3B:
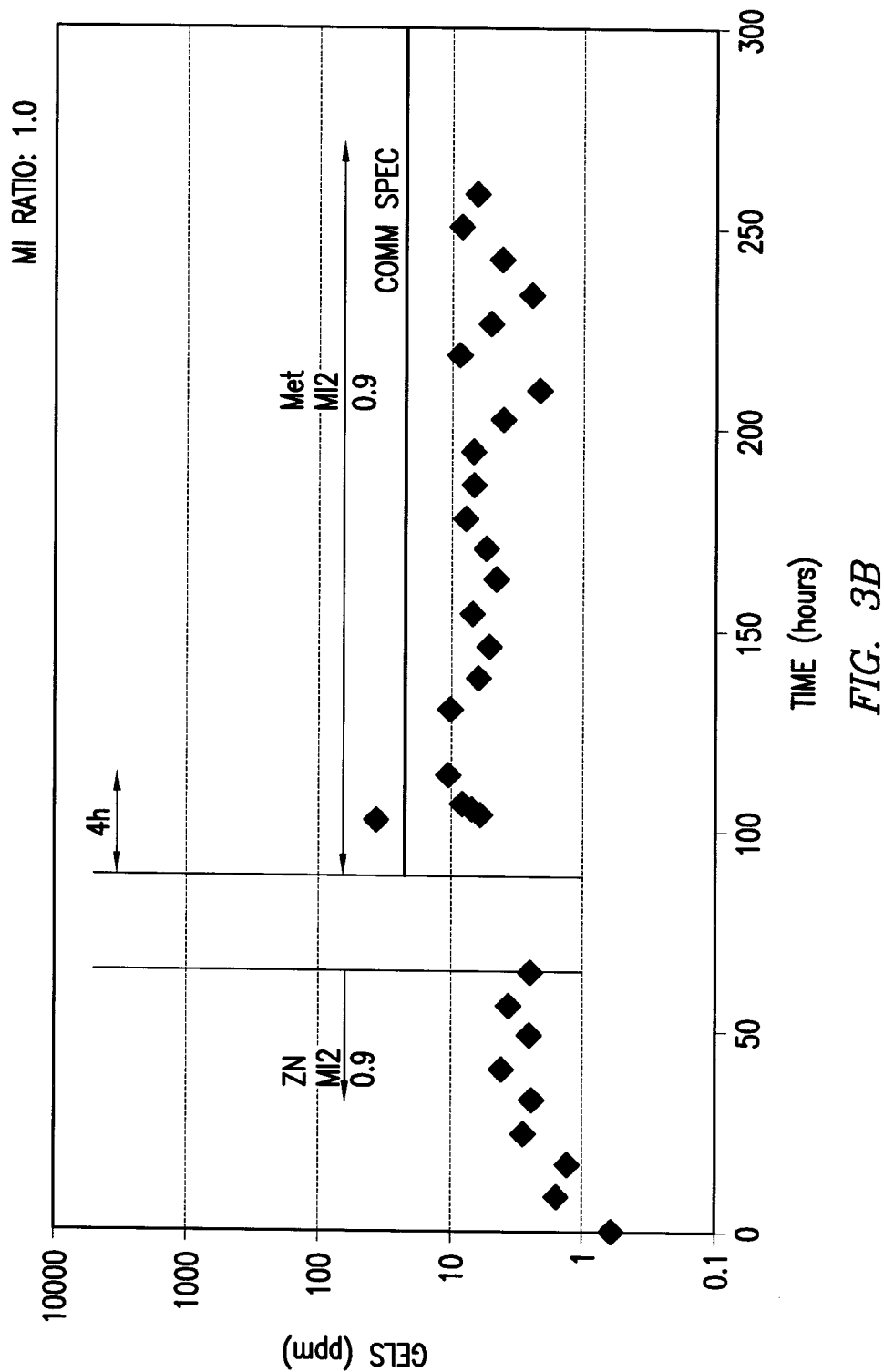

The resins were consecutively extruded. The gel level was measured as ppm as a function of time. The results are shown in FIG. 3B. The results of FIG. 3B clearly showed that the gels level was clearly under control (and reduced to acceptable values in less than 4 hours after start-up). The present inventors have shown that gels problem could be controlled. This was achieved by making sure that the melt flow index ratio between the first and the second polyethylene product was at least 0.3.

The invention claimed is:

1. A method for consecutively producing at least two polyethylene resins in one slurry loop reactor, comprising:
    producing a first polyethylene resin in the presence of a Ziegler-Natta and/or a chromium catalyst in a slurry loop reactor;
    discharging the first polyethylene resin from the slurry loop reactor prior to production of a second polyethylene resin; and
    consecutively producing the second polyethylene resin in the presence of a metallocene catalyst in the same slurry loop reactor;
    characterized in that a ratio of a melt flow index of the first polyethylene resin to a melt flow index of the second polyethylene resin is at least 0.3.

2. The method according to claim 1, wherein said production is performed continuously.

3. The method according to claim 1, wherein the ratio of the melt flow index of the first polyethylene resin to the melt flow index of the second polyethylene resin is at least 1.

4. The method according to claim 1, wherein the ratio of the melt flow index of the first polyethylene resin to the melt flow index of the second polyethylene resin is greater than 3.

5. The method according to claim 1, wherein the ratio between the melt flow index of said first polyethylene resin and the melt flow index of said second polyethylene resin is between 0.3 and 15.

6. The method according to claim 1, wherein the first polyethylene resin is produced in the presence of a Ziegler-Natta catalyst.

7. A method of transitioning between polyethylene resins of different grades comprising:
    producing in a loop reactor a first polyethylene resin in the presence of a Ziegler-Natta and/or a chromium catalyst;
    discharging the first polyethylene resin from the loop reactor prior to production of a second polyethylene resin; and
    consecutively producing in the same loop reactor the second polyethylene resin in the presence of a metallocene catalyst;
    characterized in that a ratio of a melt flow index (MI) of the first polyethylene resin to a melt flow index of the second polyethylene resin is at least 0.3.

8. The method according to claim 1, wherein an amount of off-specification polyethylene is reduced.

9. The method according to claim 7, wherein the first polyethylene resin is produced in the presence of the Ziegler-Natta catalyst.

10. The method according to claim 1, wherein deposits of the first polyethylene resin are in the slurry loop reactor after discharge of the first polyethylene resin, and wherein the second polyethylene resin removes the deposits from the slurry loop reactor.

11. The method according to claim 10, wherein the deposits are removed from the slurry loop reactor via mixing of the second polyethylene resin and the deposits.

12. The method according to claim 1, wherein the slurry loop reactor is not cleaned between the production of the first polyethylene resin and the consecutive production of the second polyethylene resin.

13. The method according to claim 1, wherein at least one of the first polyethylene resin and the second polyethylene resin exhibits a monomodal molecular weight distribution.

14. The method according to claim 1, wherein the ratio of the melt flow index of the first polyethylene resin to the melt flow index of the second polyethylene resin is between 3 and 15.

15. The method according to claim 1, wherein the ratio of the melt flow index of the first polyethylene resin to the melt flow index of the second polyethylene resin is at least about 8.3.

16. The method according to claim 1, wherein no off-specification polyethylene is produced between production of the first polyethylene resin and consecutive production of the second polyethylene resin.

17. The method according to claim 1, wherein the first polyethylene resin is produced in the presence of the chromium catalyst.

18. The method according to claim 7, wherein the first polyethylene resin is produced in the presence of the chromium catalyst.

* * * * *